July 9, 1957 F. HERZEGH 2,798,528
RUBBER TIRE VALVE ASSEMBLY WITH STIFFENING WASHER
Filed March 26, 1953
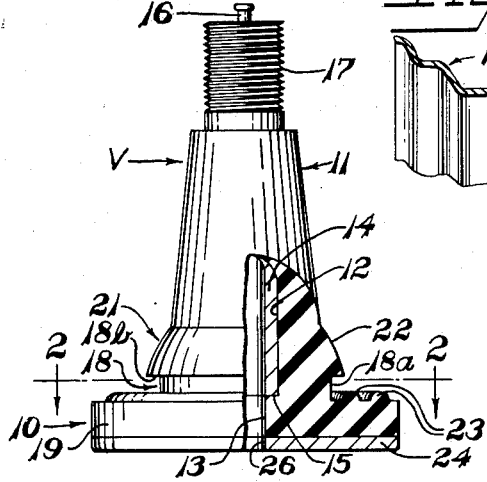
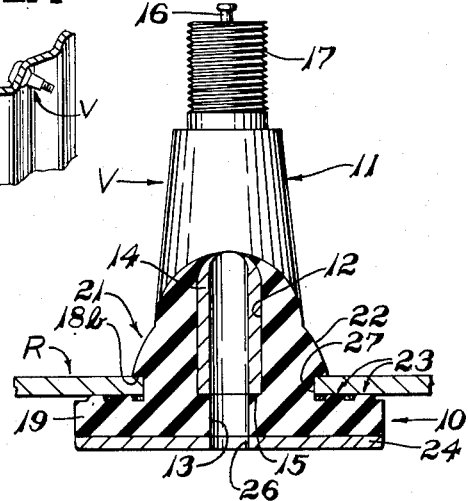
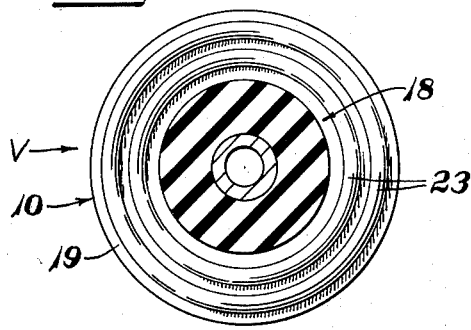
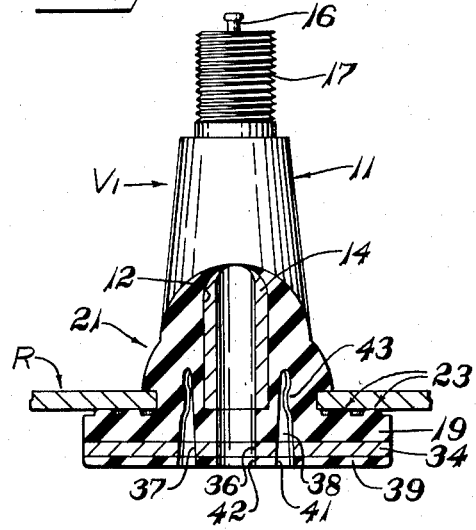
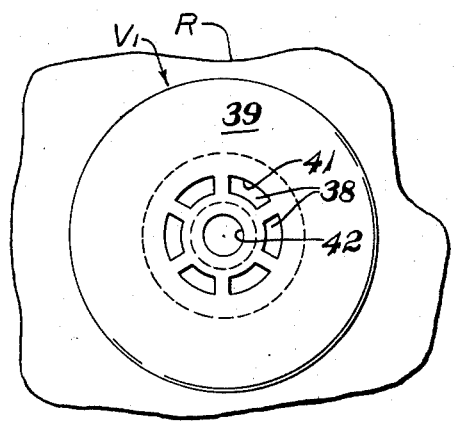
INVENTOR.
FRANK HERZEGH
BY C. E. Tripp
ATTY.

United States Patent Office 2,798,528
Patented July 9, 1957

2,798,528
RUBBER TIRE VALVE ASSEMBLY WITH STIFFENING WASHER

Frank Herzegh, Cleveland, Ohio, assignor to The B. F. Goodrich Company, New York, N. Y., a corporation of New York Application March 26, 1953, Serial No. 344,795

7 Claims. (Cl. 152—427)

This invention relates to an inflating valve of the type wherein the valve body is formed of rubber-like material, the valve being mounted in an apertured wall by forcing a retaining flange of the valve material through the aperture in the wall. Such valves are particularly useful with metallic rims fitted with tubeless tires. These valves eliminate expensive screw and nut clamps and their associated gaskets, but have presented problems of leak-proof operation due to their inherently flexible construction.

Principal objects of the invention are to facilitate assembly of the valve with its supporting wall; to provide a long-life resilient air-tight seal with the edge of the wall aperture; to facilitate the sealing action of the fluid under pressure within the tire and rim and to accommodate flexing of the valve stem on the rim without causing leakage.

Briefly these objects are accomplished by providing a rubber valve body having a stem portion and a base portion, the latter being grooved to provide opposed flanges for embracing the apertured rim wall. The usual rigid insert is bonded into the stem portion of the body. The inner end flange is preferably provided with one or more ribs facing the rim wall for providing localized pressure zones with the rim. In prior constructions the projected area of the aperture in the rim wall which provides a substantial percentage of the area of the inner flange exposed to air pressure within the tire has not been fully effective because pressure at such projected areas urges the valve body through the rim aperture and also tends to lift the inner flange away from its sealing engagement with the rim. I have found that by bonding a rigid element, preferably a metallic washer, across the end face of the inner flange (which washer is of course centrally apertured), the rigidity of the washer not only prevents axial deformation of the valve body part disposed within the rim aperture but effectively transmits the force due to air pressure over this central area to the annular sealing area of the inner end flange.

Experience with sealing rib structures of the general type referred to has shown that in cases where the flanges are of all-rubber constructions the very advantages sought by providing the ribs (localized stress zones) are not obtained to the desired extent. This is because the material of the rubber flange body will, under the action of the air pressure within the tire, tend to be axially displaced into the area between the ribs, the result being that the area of contact of the ribs is increased and the unit stress at the contact is decreased. However, by providing the washer in accordance with my invention, this crowding action is restrained and prevented, whereby the ribs can act as intended, so that only the ribs bear the force due to unbalanced air pressure. Another advantage of my construction resides in the fact that if a bending force is applied to the valve stem when installed, the washer stabilizes the inner flange and reduces the chance that any portion of the flange will momentarily separate from the rim and cause leakage.

The manner in which these and other advantages may be obtained will be apparent from the following description of a preferred embodiment of my invention.

In the drawings,

Fig. 1 is a fragmentary section of a valve assembly made in accordance with the invention.

Fig. 1A is a section through conventional drop center rim showing the valve of the invention mounted in the rim.

Fig. 2 is a section taken on line 2—2 of Fig. 1.

Fig. 3 is a partial section of a valve assembly installed in a rim.

Fig. 4 is a partial section of an installation showing axial cavities in the body of the valve.

Fig. 5 is a bottom view of the valve of Fig. 4.

The valve V in Figs. 1 and 2 comprises a body formed of vulcanized carbon-black rubber material of the type commonly employed for use on vehicle inner tube valves or the like. The valve body includes a base portion 10 and a stem portion 11 and is molded with an axial passageway 12 having a necked-down inner end portion 13. A nipple insert 14 formed of brass or the like is bonded to the wall of passageway 12 and its inner end 15 terminates at the shoulder forming the junction of the passageways 12 and 13.

The usual check valve insides 16 are threaded into the nipple 14 in the conventional manner. An exposed end of the nipple is threaded as at 17 for the valve cap. The base portion 10 of the rubber valve body is provided with a groove 18 for receiving the rim. The groove has an annular bottom wall 18a for resilient engagement with the edge of the rim aperture and one planar wall 18b for engaging the outside of the rim. As a result of the groove the base portion of the valve body is divided into an inner end flange 19 and an intermediate flange 21, the latter of which is tapered as at 22 to facilitate forcing the valve body into the rim aperture.

The side of inner flange 19 that faces the planar groove wall 18b preferably is provided with two circumferentially extending rounded ribs 23 for sealing engagement with the rim.

In order to accomplish the advantages referred to a rigid washer, preferably formed of brass, or brass-plated metal, may be bonded or vulcanized to the rubber valve body during curing. The washer 24 is centrally apertured as at 26 which aperture is preferably no larger in diameter than the bore 13 in the valve body and should be at least substantially smaller in diameter than the diameter of bottom wall 18a of groove 18 in the rubber body. The axial separation of the groove wall 18b and the outer surfaces of ribs 23 is somewhat less than the thickness of the rim R into which the valve is to be assembled. As seen in Fig. 3 rim R has an aperture 27 which should be somewhat smaller in diameter than the diameter of the bottom groove wall 18a, in order to give a pressure engagement at this point. The valve is assembled by forcing the intermediate flange 21 through the aperture 27 until the rim is embraced by the groove 18. This will cause some flattening of the ribs 23 whereby such ribs provide highly localized pressure zones for effective sealing with the inner surface of the rim.

It can now be seen that as previously stated, force due to air pressure within the rim distributed over the projected area of aperture 27 will not tend to project the corresponding rubber parts through the aperture but will be transferred and distributed over the annular portion of the flange 19 that engages the rim, thereby augmenting the sealing pressure at this area. Also, despite the increased pressure on the ribs, if properly formed they will not be completely flattened because the bonding of the washer to the flange 19 prevents the rubber from being displaced into the area between the ribs. It can also be readily seen that bending or flexing of the valve stem will have little effect upon the stabilized flange 19 due to the presence of the washer 24, in accordance with my invention.

The form shown in Figs. 4 and 5 has the advantages of the form previously described, but is adapted for use with a valve of the type described in the application of Herzegh et al., Serial No. 344,794, filed March 26, 1953, now Patent No. 2,769,476, November 6, 1956. One form of the valve disclosed in the aforesaid application embodies a plurality of cavities to increase the sealing action and to augment the flexibility of the unit, all as described in detail in the aforesaid application. Except for the washer and cavity construction, the valve V–1 of this form is like that just described. In this form, a washer 34 which is centrally apertured at 36 and has a circumferential row of apertures 37 is bonded to the base of flange 19, apertures 37 being aligned with cavities 38 molded in the valve body. If desired I may mold a rubber cover 39 on the outer surface of washer 34 which cover will likewise have molded therein apertures 41 aligned with cavities 38 and a central aperture 42. The washer 34 and cover 39 may be united with the valve body during the molding operation. As described in the aforesaid pending application, when installed in the rim R a valve of this construction exhibits bulges 43 in the cavities because of accommodation of rubber flow by the cavities. Thus all the advantages of the cavity type construction described in the aforesaid pending application are present, but are augmented by the washer 34 bonded to the flange 19 in that tendency of air pressure forces to expel the central part of the valve through the rim aperture is resisted by the washer and forces over such part are transmitted to the annular part of flange 19 that engages the rim.

Another important action of the metal washer is that it imparts positive resistance to radial inward distortion of the rubber parts, which action might occur under high heat and pressure conditions, particularly where cavities such as 38 are present.

Having described the invention so that those skilled in the art my practice the same I contemplate that modifications thereof may be made without departing from the invention as defined in the appended claims.

I claim:

1. A quickly attachable tubeless tire inflating valve for mounting in an aperture in a tire rim comprising a body of rubber-like material having a base portion having an inner end face and a stem portion extending axially from said base portion, said base portion having an annular groove formed therein, the bottom of said groove forming an annular wall for engaging the edge of the rim aperture, said groove dividing the base portion into opposed inner end and intermediate flanges for engaging opposite sides of the rim around the rim aperture, a bore through said valve body, a rigid tubular insert bonded to said body within said bore, and a rigid washer bonded to the inner face of said inner end flange, said washer being substantially coextensive with said inner end flange and having a central aperture of a diameter substantially smaller than that of said annular groove wall, said insert stopping short of said washer to provide for limited flexing of said valve.

2. A quickly attachable tubeless tire inflating valve for mounting in an aperture in a tire rim comprising a body of rubber-like material having a base portion having an inner end face and a stem portion extending axially from said base portion, said base portion having an annular groove formed therein, the bottom of said groove forming an annular wall for engaging the edge of the rim aperture, said groove dividing the base portion into opposed inner end and intermediate flanges for engaging opposite sides of the rim around the rim aperture, said inner end flange being of substantially larger diameter than said intermediate flange and having a circumferential rib facing said intermediate flange, a bore through said valve body, a rigid tubular insert bonded to said body within said bore, and a rigid washer bonded to the inner face of said inner end flange, said washer being substantially coextensive with said inner end flange and having a central aperture of a diameter substantially smaller than that of said annular groove wall, said insert stopping short of said washer to provide for limited flexing of said valve.

3. A quickly attachable tubeless tire inflating valve for mounting in an aperture in a tire rim comprising a body of rubber-like material having a base portion having an end face and a stem portion extending axially from said base portion, said base portion having an annular wall for sealingly engaging the edge of the rim aperture, a bore through said valve body, a rigid tubular insert bonded to said body within said bore, a plurality of circumferentially spaced cavities extending axially into said base portion from the end face thereof, said axially extending cavities being disposed between said bore and said annular wall whereby restriction of said annular wall by the rim is accommodated by deformation of the rubber about and into said cavities, and a metallic washer bonded to said end face, said washer being substantially coextensive with said inner end flange and having a central aperture and apertures aligned with said cavities, said insert stopping short of said washer to provide for limited flexing of said valve.

4. A quickly attachable tubeless inflating valve for mounting in an aperture in a tire rim comprising a body of rubber-like material having a base portion having an end face and a stem portion extending axially from said base portion, said base portion having an annular groove formed therein, the bottom of said groove forming an annular wall for sealingly engaging the edge of the rim aperture, said groove dividing the base portion into opposed inner end and intermediate flanges for engaging opposite sides of the rim around the rim aperture, said inner end flange being of substantially larger diameter than said intermediate flange and having a circumferential rib facing said intermediate flange, a bore through said valve body, a rigid tubular insert bonded to said body within said bore, a plurality of circumferentially spaced cavities extending axially into said base portion from the end face thereof, said axially extending cavities being disposed between said bore and said annular wall whereby restriction of said annular wall by the rim is accommodated by deformation of the rubber about and into said cavities, and a metallic washer bonded to said end face, said washer being substantially coextensive with said inner end flange and having a central aperture and apertures aligned with said cavities, said insert stopping short of said washer to provide for limited flexing of said valve.

5. A quickly attachable tubeless tire inflating valve for mounting in an aperture in a tire rim comprising a body of rubber-like material having a base portion having an end face and a stem portion extending axially from said base portion, said base portion having an annular groove formed therein, the bottom of said groove forming an annular wall for engaging the edge of the rim aperture, said groove dividing the base portion into opposed inner end and intermediate flanges for engaging opposite sides of the rim around the rim aperture, said inner end flange being of substantially larger diameter than said intermediate flange and having a circumferential rib facing said intermediate flange, a bore through said valve body, a rigid tubular insert bonded to said body within said bore, a plurality of circumferentially spaced cavities extending axially into said base portion from the end face thereof, said axially extending cavities being disposed between said bore and said annular wall whereby restriction of said annular wall by the rim is accommodated by deformation of the rubber about and into said cavities, and a metallic washer bonded to said end face, said washer being substantially coextensive with said inner end flange and having a central aperture and apertures aligned with said cavities, and a rubber cover bonded to said washer and having apertures aligned with those in the washer, said insert stopping short of said washer to provide for limited flexing of said valve.

6. In combination, a tire rim having laterally spaced tire mounting portions and a wall portion between said spaced portions, an aperture in said wall portion, a quickly attachable tubeless tire inflating valve comprising a body of rubber-like material having a base portion having an end face and a stem portion extending axially from said base portion, said base portion having an annular groove formed therein, the bottom of said groove forming an annular wall sealingly engaging the edge of said rim aperture, said groove dividing the base portion into opposed inner end and intermediate flanges engaging opposite sides of the rim around the rim aperture, a bore through said valve body, a rigid tubular insert bonded to said body within said bore, and a plurality of circumferentially spaced cavities extending axially into said base portion from the end face thereof, said axially extending cavities being disposed between said bore and said annular wall, and a rigid washer bonded to said end face, said washer being substantially coextensive with said inner end flange and having a central aperture and apertures aligned with said cavities, the force due to air pressure over the area bonded by said cavities being transmitted by said washer to that portion of said inner end flange that engages said rim, said insert stopping short of said washer to provide for limited flexing of said valve.

7. In combination, a tire rim having laterally spaced tire mounting portions and a wall portion between said spaced portions, an aperture in said wall portion, a quickly attachable tubeless tire inflating valve comprising a body of rubber-like material having a base portion having an end face and a stem portion extending axially from said base portion, said base portion having an annular groove formed therein, the bottom of said groove forming an annular wall sealingly engaging the edge of said rim aperture, said groove dividing the base portion into opposed inner end and intermediate flanges engaging opposite sides of the rim around the rim aperture, said inner end flange being of substantially larger diameter than said intermediate flange and having a circumferential rib facing said intermediate flange, a bore through said valve body, a rigid tubular insert bonded to said body within said bore, and a metallic washer bonded to the inner face of said inner end flange, said washer being substantially coextensive with said inner end flange and having a central aperture of a diameter substantially smaller than that of said annular groove wall, whereby air pressure force over the projected area of said rim aperture is transmitted to the area of said inner end flange that engages said rim, said insert stopping short of said washer to provide for limited flexing of said valve.

References Cited in the file of this patent

UNITED STATES PATENTS

| | | |
|---|---|---|
| 2,049,252 | Eberhard | July 28, 1936 |
| 2,126,770 | Hammond | Aug. 16, 1938 |
| 2,309,430 | Albert | Jan. 26, 1943 |
| 2,608,235 | Wyman | Aug. 26, 1952 |
| 2,634,748 | Tubbs | Apr. 14, 1953 |